(12) United States Patent
Alissa et al.

(10) Patent No.: US 11,814,574 B1
(45) Date of Patent: Nov. 14, 2023

(54) ORGANIC SLUDGE TARGETED REMOVAL USING NITRO-ACTIVATED CARBON COMPOSITE AND ACIDIFIED SOLUTION OF AMMONIUM CHLORIDE

(71) Applicant: SAUDI ARABIAN OIL COMPANY, Dhahran (SA)

(72) Inventors: Faisal Mohammed Alissa, Dammam (SA); Abdualilah Ibrahim Al-Baiz, Al Khubar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/660,932

(22) Filed: Apr. 27, 2022

(51) Int. Cl.
C09K 8/536 (2006.01)
E21B 37/06 (2006.01)
C09K 8/524 (2006.01)
C09K 8/528 (2006.01)

(52) U.S. Cl.
CPC .............. *C09K 8/524* (2013.01); *C09K 8/528* (2013.01); *C09K 8/536* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 9,657,552 B2 | 5/2017 | Choudhary et al. | |
| 9,738,824 B2 | 8/2017 | Al-Nakhli et al. | |
| 10,053,614 B2 | 8/2018 | Al-Nakhli et al. | |
| 10,151,186 B2 | 12/2018 | Al-Nakhli | |
| 10,494,566 B2 | 12/2019 | Al-Nakhli et al. | |
| 10,718,184 B1 | 7/2020 | Alharith | |
| 10,801,305 B2* | 10/2020 | Hall | E21B 37/06 |
| 2007/0272552 A1* | 11/2007 | Jiang | G01N 27/3335 204/422 |

(Continued)

FOREIGN PATENT DOCUMENTS

WO 2021004579 A1 1/2021

OTHER PUBLICATIONS

Alade, Olalekan, et a., "A Novel Method of Removing Emulsion Blockage after Drilling Operations Using Thermochemical Fluid", Mar. 2021 SPE Drilling & Completion, Society of Petroleum Engineers, 2021, pp. 88-100 (13 pages).

(Continued)

*Primary Examiner* — Andrew Sue-Ako
(74) *Attorney, Agent, or Firm* — Osha Bergman Watanabe & Burton LLP

(57) ABSTRACT

An injection fluid composition includes a treatment agent and a carrier fluid. The treatment agent includes a material having a reactive surface functionality. The material having a reactive surface functionality is selected from the group consisting of graphite, graphene, activated carbon, and combinations thereof. Additionally, a method of treating a sludge in production tubing is presented. The method includes injecting a first fluid including a treatment agent in a carrier fluid into the production tubing, contacting the sludge with the treatment agent, maintaining the first fluid downhole such that the treatment agent adheres on a surface of the sludge, injecting a second fluid comprising a stimulating agent to stimulate the treatment agent, and extracting compounds of the sludge from the production tubing.

16 Claims, 11 Drawing Sheets

(56) References Cited

U.S. PATENT DOCUMENTS

| | | | |
|---|---|---|---|
| 2009/0148374 A1* | 6/2009 | Choi | C10G 27/04 |
| | | | 422/600 |
| 2011/0203797 A1 | 8/2011 | Alexandrov et al. | |
| 2015/0368539 A1* | 12/2015 | Tour | C09K 8/03 |
| | | | 340/854.3 |
| 2016/0244659 A1 | 8/2016 | Shahin et al. | |

OTHER PUBLICATIONS

Al-Nakhli, Ayman, et al., "In-Situ Steam Generation A New Technology Application for Heavy Oil Production", SPE-184118-MS, Society of Petroleum Engineers, Dec. 2016, pp. 1-19 (19 pages).

Al-Nakhli, Ayman, et al., "Removal of Condensate Banking from Different Formations Using Thermochemical Treatment", SPE-197847-MS, Society of Petroleum Engineers, Nov. 2019, pp. 1-16 (16 pages).

Ibrahim, J.M. and K. Ali, "Thermochemical Solution for Removal of Organic Solids Deposit In and Around Wellbore and Production Tubing", SPE 93844, Society of Petroleum Engineers, Apr. 2005, pp. 1-10 (10 pages).

Rocha, Nelson O., et al., "Thermochemical Process to Remove Sludge from Storage Tanks", SPE 105765, Society of Petroleum Engineers, Feb.-Mar. 2007, pp. 1-8 (8 pages).

Shafeeyan, Mohammad Saleh, et al., "Modification of Activated Carbon Using Nitration Followed by Reduction for Carbon Dioxide Capture", Bulletin of the Korean Chemical Society, Wiley Online Library, vol. 36, 2015, pp. 533-538 (6 pages).

Tariq, Zeeshan, et al., "An Experimental Evaluation of Thermochemical Fracturing in Layered Formations", SPE-201178-MS, Society of Petroleum Engineers, Nov. 2019, pp. 1-12 (12 pages).

\* cited by examiner

ORGANIC SLUDGE TARGETED REMOVAL USING NITRO-ACTIVATED CARBON COMPOSITE AND ACIDIFIED SOLUTION OF AMMONIUM CHLORIDE

BACKGROUND

Oil and gas production operations depend on many factors such as reservoir type (i.e. crude or gas reservoirs), reservoir characteristics, and water quality. Each of these factors contribute to creating a challenging environment during production. For example, low pressure and temperature reservoirs may experience the formation of a sludge. Sludge is a heterogeneous type of scale containing both organic and inorganic materials. Sludge may occur in various locations inside the wellbore. For instance, sludge may contain waxy materials that can adhere on to a wall of the production tubing and negatively impact production of target hydrocarbons from downhole to the surface. Hence, sludge may cause blockage and restrict production of hydrocarbons, ultimately resulting in operational delays and economic impacts.

Treatment methods may be employed to remove undesired sludge buildup. However, such methods often lack the security of safe operations and can jeopardize the integrity of a reservoir and production equipment. For example, severe tubing corrosion may be induced due to the presence of an acid, water, and heat. A targeted method for removing sludge from production tubular is needed as an enhanced remediation tactic in which the heat is generated around the sludge only to assure the integrity of the rest of the tubing by reducing the amount of heat generated and to achieve a cost-effective descaling operation by reducing the amount of reactant chemicals.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an injection fluid composition that includes a treatment agent including a material having a reactive surface functionality and a carrier fluid. The material having a reactive surface functionality is selected from the group consisting of graphite, graphene, activated carbon, and combinations thereof.

In another aspect, embodiments disclosed herein relate to a method of treating a sludge in production tubing, the method includes injecting a first fluid comprising a treatment agent in a carrier fluid into the production tubing, contacting the sludge with the treatment agent, maintaining the first fluid downhole such that the treatment agent adheres on a surface of the sludge, injecting a second fluid comprising a stimulating agent to stimulate the treatment agent, and extracting compounds of the sludge from the production tubing.

Other aspects and advantages of the claimed subject matter will be apparent from the following description and the appended claims.

DETAILED DESCRIPTION

The present disclosure relates to an activated carbon composition and method of use for the remediation of sludge from a variety of operations. As described herein, sludge may be heterogeneous sludge, which may include inorganic materials, such as scale, mixed with organic petroleum compounds. Non-limiting examples of the inorganic materials in the sludge may include calcium carbonate, calcium magnesium carbonate, iron carbonate, iron oxides, the inorganic acid soluble material forms of iron sulfide, among others.

Figure 1:
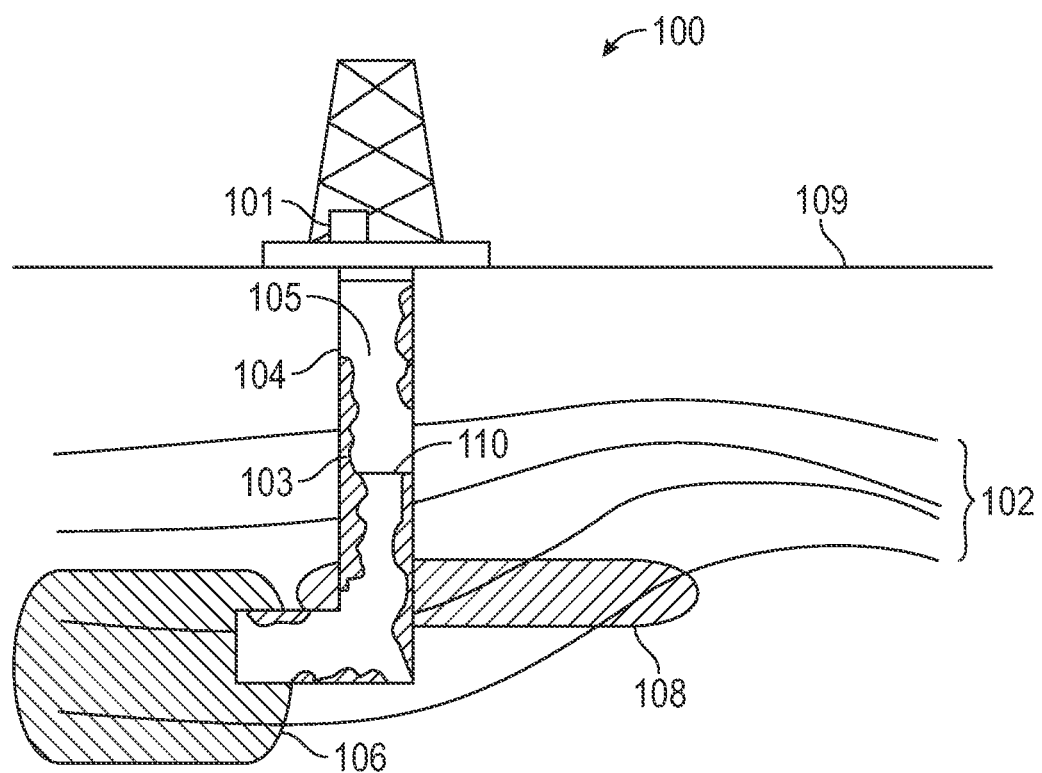
FIG. 1 is an example of an oil production facility 100 in accordance with one or more embodiments of the present disclosure.

A non-limiting example of sludge formation from oil and gas operations is shown in FIG. 1, which also shows an example of an oil production facility 100 in accordance with one or more embodiments of the present disclosure. The oil production facility 100 is located above a hydrocarbon reservoir 102, which may include an oil rig 110 may include a choke manifold 101 in fluid communication with a target zone of formation 106 and an wellbore 104 to extract hydrocarbons 108. The wellbore 104 includes a bored hole (i.e., a borehole) that extends from the surface 109 towards the target zone of the formation 106. During drilling operations, drilling fluid is circulated through the wellbore 104 to facilitate smooth drilling operations. During production operations, substances (e.g., water and other chemicals used for oil recovery) are injected into the wellbore 104 and travel through a well 105 to the target zone of the formation 106. Due to well damage or solid accumulation within the wellbore 104 during operation, sludge 103 may accumulate on the surface of the wellbore 104. As mentioned above, the treatment methods of one or more embodiments of the present disclosure are not limited to treatment of an oil and gas reservoir during the drilling phase.

Sludge 103 is a collection of chemical materials restricting the flow of fluids from a drilling apparatus in a reservoir that often impedes drilling operations. As mentioned above, heterogeneous sludge may be classified into two main components: organic sludge and inorganic scale. Inorganic scale is commonly formed from the aqueous phase of reservoir fluids. In contrast, organic sludge is water repellant, often waxy matter, that does not need the presence of an aqueous solution to form in a reservoir.

In one or more embodiments of the present disclosure, the sludge 103 may be an inorganic scale, an organic sludge, such as a paraffinic wax, and combinations thereof. The sludge treatment method of the present disclosure includes injecting a first treatment fluid to a treatment area, flooding the treatment area with the first treatment fluid, introducing a second treatment fluid into the treatment area, and removing the sludge from the treatment area. In one or more particular embodiments, an optional step of identifying a sludge may be performed before the injection of the first treatment fluid.

The first treatment fluid composition may be an organic solvent including a sludge treatment agent. In such embodiments, the first treatment fluid composition includes a carrier fluid and the treatment agent that may be an activated carbon. The activated carbon may be functionalized with at least one nitro group on the surface of the activated carbon. The second treatment fluid may be an aqueous fluid that includes at least one additive. At least one additive of the second treatment fluid may interact with the surface functionality on the activated carbon, and in particular nitro groups. In such interactions, an exothermic reaction, a nitrogen gas, a nitrogen dioxide gas, or combinations thereof may be generated.

Sludge Treatment Fluid Composition

In one or more embodiments, the first treatment fluid of the present disclosure may include a carrier fluid and a treatment agent.

In such embodiments, the carrier fluid may be an organic fluid. The organic fluid may be an aliphatic solvent, an aromatic solvent, and combinations thereof. In one or more particular embodiments, the organic fluid may be an aromatic or aliphatic solvent including, but not limited to, a xylenes solvent, an ethylbenzene solvent, a toluene solvent, or a diesel solvent.

The carrier fluid may include other additives provided the additives do not interfere with activity of the treatment agent or the second treatment fluid. Such additives may include, for instance, one or more wetting agents, corrosion inhibitors, biocides, surfactants, dispersants, interfacial tension reducers, mutual solvents, and thinning agents. The identities and use of the aforementioned additives are not particularly limited. One of ordinary skill in the art will, with the benefit of this disclosure, will appreciate that the inclusion of a particular additive will depend upon the stage of reservoir operations, desired application, and properties of a given wellbore fluid. For instance, a wellbore fluid of one or more embodiments that is a completion fluid may comprise a treatment agent of a sludge formation during completion operations.

The first treatment fluid may have a variety of properties making it suitable for use in treating sludge buildup in subterranean formations. For example, the first treatment fluid may be capable of interacting with the surface of the sludge such that components of the carrier fluid may adhere to the sludge. Additionally, the viscosity of the fluid may in a sufficient range to allow facile fluid flow with pumping equipment downhole and facile flow back upon return to the surface. Furthermore, the boiling point of the carrier fluid may be sufficiently high for the first treatment fluid to remain in the liquid phase at downhole temperatures.

In one or more embodiments, a treatment agent may be dispersed in the first treatment fluid. The treatment agent may be a sludge treatment agent. In one or more embodiments, the sludge treatment agent may be soluble, partially soluble, or insoluble in the carrier fluid. In one or more particular embodiments, the sludge treatment agent is insoluble in the carrier fluid. Non-limiting examples of the sludge treatment agent may be a polyaromatic material with a reactive surface functionality. In one or more particular embodiments, the polyaromatic material may be a mesoscale material. As used herein "mesoscale material" refers to a material that has pores on the mesoscale, or a mesoporous material. As used in this disclosure, the term "mesoporous material" refers to a material with pores ranging in size from about 2 nm (nanometers) to about 50 nm. The mesoscale material may have an average particle size on the micron scale.

In one or more embodiments, the polyaromatic mesoscale material may be selected from the group consisting of activated carbon, graphite, graphene, and combinations thereof. In one or more particular embodiments, the polyaromatic mesoscale material may be a material with a size in the microscale. For example, the polyaromatic mesoscale material may have a size ranging from about 1 micron to about 1000 microns.

In one or more particular embodiments, the polyaromatic mesoscale material may be an activated carbon. As used herein, "activated carbon" refers to a carbon material that is processed to have high surface area and pore volume. In general, an activated carbon may have a surface area of from 500 $m^2$/g (meters squared per gram) to 3000 $m^2$/g and a pore volume of from 0.5 mL/g (milliliters per gram) to 1.1 mL/g. An activated carbon material may be particularly useful for one or more embodiments of the present disclosure because a high surface area and pore volume allow for a large relative amount of surface functionality per mass of carbon as a treatment agent.

In one or more embodiments of the present disclosure, the activated carbon treatment agent has a suitably high surface area for the treatment agent to provide sufficient heat generation when activated. The surface area of the activated carbon is an important property as a higher surface area carbon provides more of the treatment agent per kilogram of surface activated carbon. As one of ordinary skill may appreciate, the surface area of the activated carbon may be measured with a Brunauer-Emmett-Teller (BET) surface analysis technique. The activated carbon may have a surface area in a range of 500 $m^2$/g to 3000 $m^2$/g. In one or more particular embodiments, the activated carbon may have a surface area in a range of 2500 to 3000 $m^2$/g.

In one or more embodiments, the activated carbon may be a fine powder. In such embodiments, the fine powder of the activated carbon may have a density in the range of 0.20 to 0.55 g/mL. The fine powder may have a density of about 0.45 g/mL (gram per milliliter), or 450 $kg/m^3$ (kilogram per meters cubed).

In one or more embodiments, the activated carbon may be a microscale material. The activated carbon may be made up of particles having a roughly spherical shape, or they may be irregular in shape. In one or more embodiments, the activated carbon particles may have an average particle size with a lower limit of one of 10, 12, 15, 17, 20, 21, 22, 23, 24, 25, and 26 microns and an upper limit of any one of 24, 25, 26, 27, 28, 29, 30, 32, 35, 38, 40, 42, 45, 47, and 50 microns, where any lower limit can be used in combination with any mathematically-compatible upper limit. Thus, the activated carbon may have particle sizes that are microscale.

The activated carbon may have a structural stability to withstand conditions in an oil and gas reservoir. Thus, the activated carbon does not chemically degrade or breakdown under reservoir conditions. Furthermore, in such embodiments, the activated carbon has a compatible surface to physically associate to at least one organic compound in a sludge containing at least one organic material.

The activated carbon may be modified to include a particular surface functionality to provide a surface activated carbon. In one or more embodiments, the surface activated carbon may have a functionalized surface chemistry. The functionalized surface chemistry (or "surface functionality") may be configured to undergo a reaction upon an introduction of a stimulus so as to produce an exothermic process and a gas. The functionalized surface chemistry may include at least one reactive compound. The reactive compound may include, but is not limited to, a nitro group having a structure as shown as the final product in Equation (I). Equation (I) also details the method of producing an electrophilic nitronium ion through acidic activation of nitric acid. A carbon nucleophile (RNuc) may further react to form a functionalized nitro product.

Equation (I)

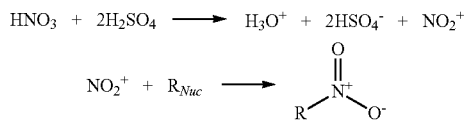

where R is a carbon atom of the activated carbon as described above.

The surface activated carbon may have between 1 to 15 wt % (weight percent) nitro groups on the surface of the activated carbon. In one or more embodiments, the mass percent of the nitro groups may be determined via energy of heat generation. For example, an amount of 15 wt % of sodium nitrite ($NaNO_2$) and an equivalent amount of ammonium chloride ($NH_4Cl$) can generate 225 KCal (kilocalories). If a surface activated carbon as described above generates 63 KCal, then the amount of energy produced by the surface activated carbon may be divided by the energy produced from the reference $NaNO_2$/$NH_4Cl$ combination. As such, the surface activated carbon is determined to be 28% of the reference combination. Therefore, 28% of 15 wt % provided by the reference combination may be calculated to be 4.2 wt % nitro groups of the surface activated carbon.

Figure 2:
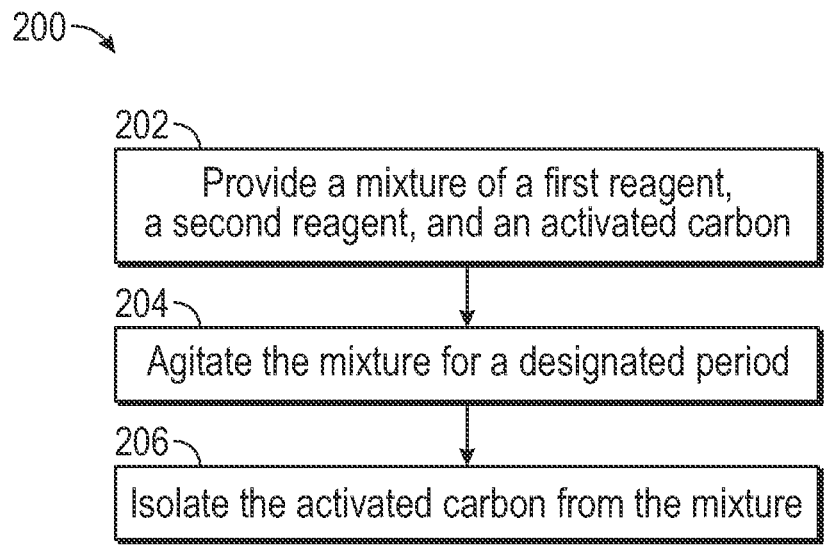
FIG. 2 is a flowchart that details the process of making a surface activated carbon in accordance with one or more embodiments.

In one or more embodiments, a surface activation process may be used to generate the surface activated carbon, as shown in FIG. 2. The surface activation process 200 may include a treatment to functionalize the surface of the activated carbon with at least one nitro group. The treatment includes introducing an activated carbon to a first reagent 202 to form a first mixture. The first mixture may be agitated such that the activated carbon is uniformly distributed within the first reagent. The first agitation stage may range from about ten minutes to six hours. The first reagent includes a first acid, such as sulfuric acid.

A second reagent may then be introduced to the first mixture to form a second mixture 204. The second reagent may be added slowly, such as dropwise, to the first mixture. The addition of the second reagent to the first reagent is an exothermic reaction, generating significant heat, so the addition should be performed slowly. The second reagent includes a second acid that is different than the first acid, such as nitric acid. The ratio of the second reagent to the first reagent may be in a range of 1:2 to 1:5 molar equivalents. In some embodiments the amount of the activated carbon may be in a range from 10 to 15 wt % of the total reaction mixture. The first reagent and the second reagent may optionally be combined to form a reagent mixture prior to the addition of the activated carbon.

The second mixture may be agitated in step 206 to allow a nitro-surface activated carbon product to form. In addition, the reaction mixture may be heated to reflux during agitation. The second agitation stage may range from about ten minutes to six hours. The surface activated carbon product may then be isolated using an isolation procedure. In one or more particular embodiments, the surface activated carbon is a solid product. In such embodiments, the isolation procedure may include filtering the surface activated carbon from the reagent solutions. Subsequent washing of the solid surface activated carbon with water may be performed for sufficient removal of acids.

Once an activated carbon has been treated as described above to include a reactive surface functionality, the surface activated carbon may be added to a carrier fluid for use in removing sludge. The activated carbon may be included in the carrier fluid in an amount ranging from 0.05 to 1.00 kg/L (kilogram per liter) of the carrier fluid. In one or more embodiments, the amount of surface activated carbon in the carrier fluid has a lower limit of one of 0.05, 0.06, 0.07, 0.08, 0.10-, 0.25, 0.40, 0.50, 0.60, 0.75, and 0.80 kg/L and an upper limit of any one of 0.25, 0.50, 0.60, 0.70, 0.75, 0.80, 0.85, 0.90, 0.95, 0.99, and 1.00 kg/L, where any lower limit can be used in combination with any mathematically-compatible upper limit.

The first treatment fluid, which includes the carrier fluid, the activated carbon and other optional additives, may contain an amount of the activated carbon in an organic fluid to deliver to the sludge treatment area. The amount of the surface activated carbon may be in a range of 0.05 kg/L to 1.00 kg/L of the first treatment fluid. In an exemplary embodiment, the first treatment fluid may include 0.625 kg/L of the surface activated carbon in an organic fluid.

As noted above, a treatment composition in accordance with the present disclosure includes a first treatment fluid as described above and a second treatment fluid. In one or more embodiments, the second treatment fluid may be an aqueous fluid. The aqueous fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters and combinations thereof that are suitable for use in a wellbore environment, that is, the contaminants do not interfere with the function of the second treatment fluid. In one or more embodiments, the water used may naturally contain contaminants, such as salts, ions, minerals, organics, and combinations thereof, such that the contaminants do not interfere with the function of the second treatment fluid. In one or more embodiments, additives may also be included as described above such that the additives do not interfere with the function of the second treatment fluid.

The second treatment fluid may also include a stimulating agent. The stimulating agent may include a first reactive compound that is reactive with nitro groups on the surface activated carbon. Non-limiting examples of the reactive compound of the second treatment fluid are ammonium containing compounds such as, ammonium chloride, ammonium bromide, ammonium nitrate, ammonium sulfate, ammonium carbonate, and ammonium hydroxide. In particular embodiments, the ammonium containing compound may be ammonium chloride. In one or more embodiments, an amount of ammonium chloride of the second treatment fluid may be in an equivalent mass amount to the surface activated carbon of the first treatment fluid.

In one or more embodiments, the aqueous fluid of the stimulating agent of the second treatment fluid includes a second reactive compound that reacts with the nitro groups on the surface activated carbon. In such embodiments, the second reactive compound is an acid. The acid may be a protic acid, such as an organic acid, an inorganic acid, or combinations thereof. The organic acid may be acetic acid, and the inorganic acid may be hydrochloric acid or sulfuric acid. The acid may be included in the second treatment fluid in an amount ranging from about 7 wt % to about 28 wt % of the total volume of the second treatment fluid. In an exemplary embodiment, the aqueous fluid of the second treatment fluid is 15 wt % hydrochloric acid.

Sludge Treatment Method

Figure 3:
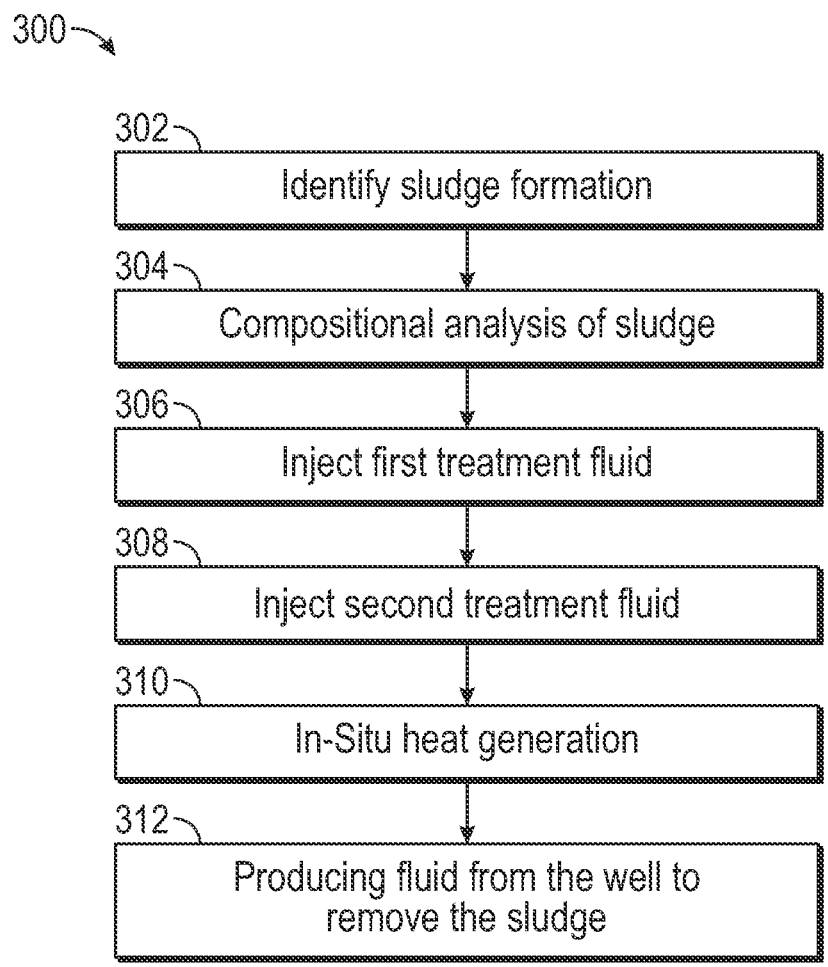
FIG. 3 is a flowchart for the process of treating a sludge of a reservoir in accordance with one or more embodiments.

As mentioned above, the sludge treatment of one or more embodiments may be used in a variety of oil and gas applications. A method for sludge treatment 300 using the previously described composition is shown in FIG. 3. In one or more embodiments, a sludge in an oil and gas reservoir may be provided in step 302. Optionally, a compositional analysis the sludge may be performed to determine the type of sludge as shown in step 304. A first treatment fluid may be injected in step 306 into a well, and a second treatment fluid may be injected in step 308 after the first treatment fluid. An in-situ heat generation reaction in step 310 may be initiated upon the introduction of the second treatment fluid. In one or more embodiments, after introducing the first and second treatment fluids, fluid may be produced from the well in order clear a treated sludge of the sludge treatment area, step 312 of FIG. 3.

Figure 4:
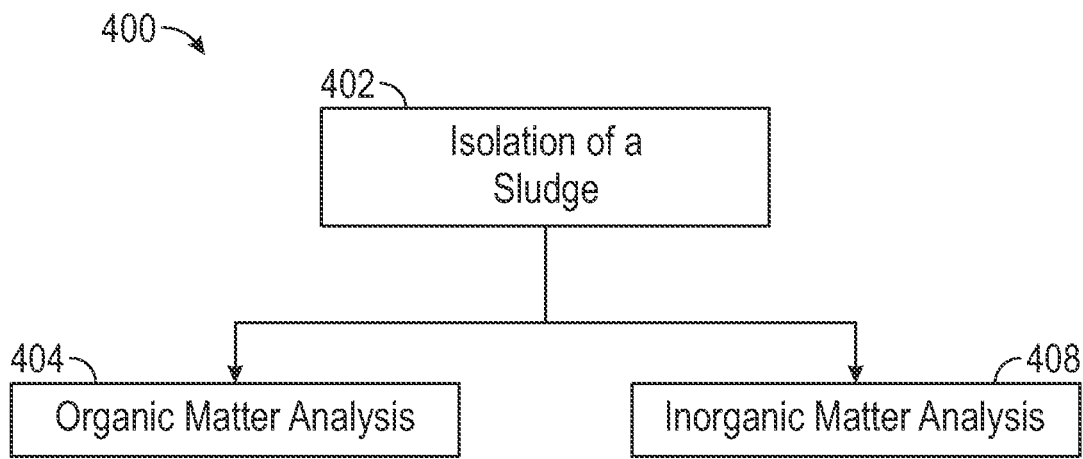
FIG. 4 is a flowchart for the compositional analysis of a sludge of an oil and gas reservoir in accordance with one or more embodiments

In one or more particular embodiments, the sludge materials may be subjected to compositional analysis 400, as shown in FIG. 4. In such embodiments, a sludge may be isolated in step 402. The concentration of the organic materials of the sludge may be determined from an organic matter compositional analysis in step 404. The compositional analysis of the organic matter of step 404 of the sludge may be performed using an analytical method, such as gas chromatography (GC), which are then separated and analyzed for chemical composition. Inorganic matter compositional analysis may be performed in step 408 using techniques known to one of ordinary skill in the art, such as thermogravimetric analysis, extraction, powder X-ray diffraction, elemental analysis, among others. The compositional analysis may also provide information as to a ratio of inorganic material, water, organic material, or combinations thereof. The amounts of individual components of the treatment composition may be selected based upon the chemical composition of the sludge.

Figure 5:
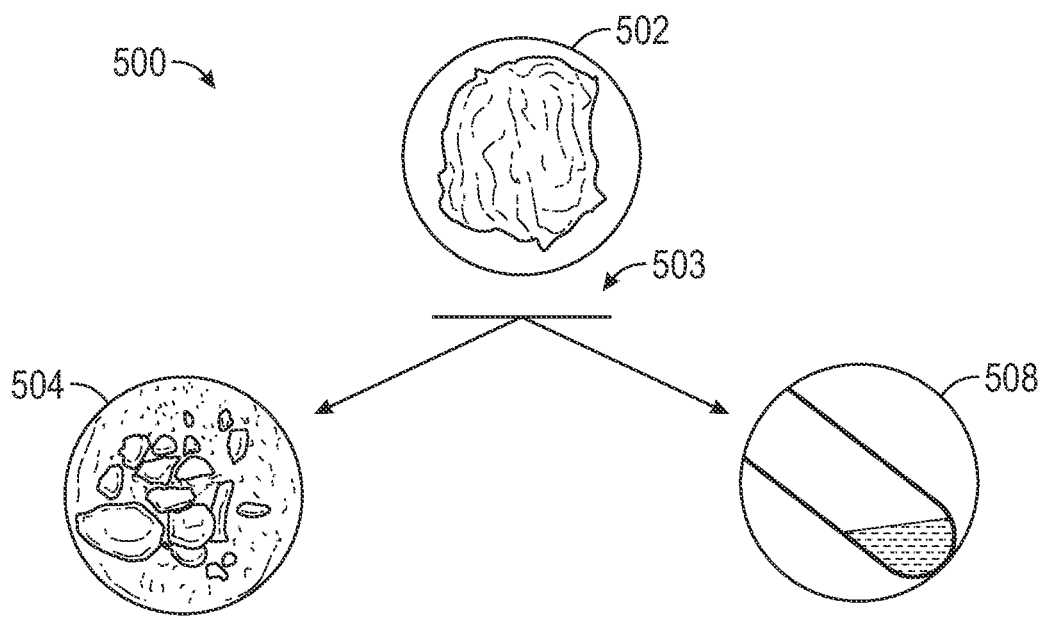
FIG. 5 is a schematic of a composition of a sludge in accordance with one or more embodiments.

FIG. 5 is a schematic 500 for the compositional analysis of a sludge 502 that was determined in process 503 to assess contents of inorganic material 504 and organic material 508. The sludge sample of one or more embodiments may include inorganic materials in a range from about 35 wt % to about 50 wt %. The organic materials of sludge of one or more embodiments may be in a range from about 50 wt % to about 65 wt %. The sludge of one or more embodiments may have a water content in a range from about 0 wt % to about 1 wt % of a sludge material.

Figure 6:
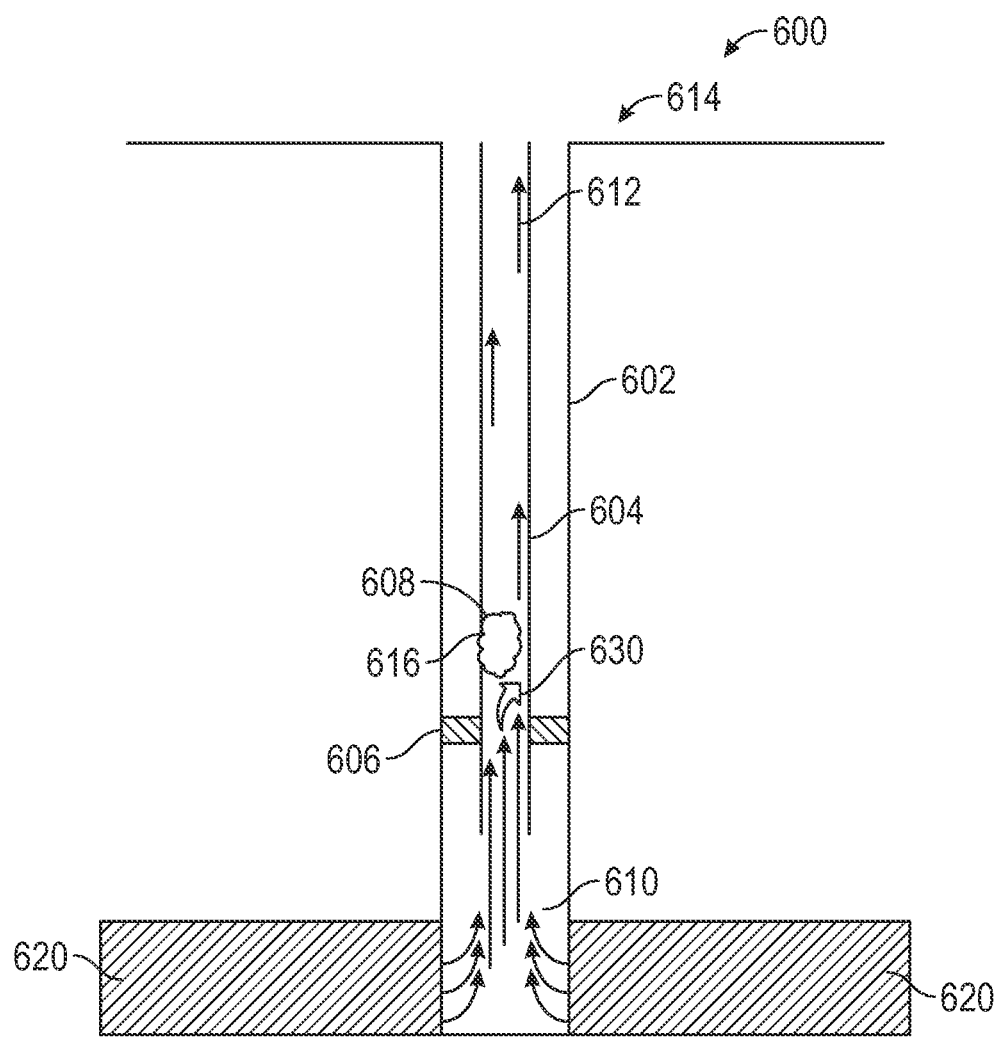
FIG. 6 is a schematic of a sludge present in production tubing of a well environment in accordance with one or more embodiments.

FIG. 6 is a diagram that illustrates a reservoir environment 600 in accordance with one or more embodiments. Reservoir environment 600 includes a subsurface of an oil zone 620. Oil zone 620 is depicted having a wellbore casing 602 both extending downhole from a surface 614 into the oil zone 620. A production tubular (or "tubing") 604 also extends from surface 614 to the subsurface proximate to the oil zone 620 and is supported by a packer 606. The subsurface also includes sludge 608 in the production path to the reservoir surface 614. Sludge 608 formation has a formation face 616 that fluidly couples sludge 608 with production tubing 604. Fluid flow indicated by arrows 610 from oil zone 620 may travel through production tubing 604 to the reservoir surface 614. In one or more optional embodiments, sludge 608 may be external to tubing 604 and downhole of packer 606 such that hydrocarbon flow from oil zone 620 to the production tubing 604 is impacted. As shown in FIG. 6, fluid flow represented by arrows 610 from the oil zone 620 may be impacted at an impaction zone 630 of the production tubing that may restrict the flow of production fluids to the reservoir surface 614.

In one or more particular embodiments, a sludge in a well may optionally be identified with a running gauge cutter, which is used to detect scale, sludge, debris, among other materials, that creates obstacles in oil and gas operations. In such embodiments, a sludge treatment may be performed if the rate of production is decreasing such that the well hydrocarbon production has significantly decreased, and reservoir restoration is desired.

Figure 7:
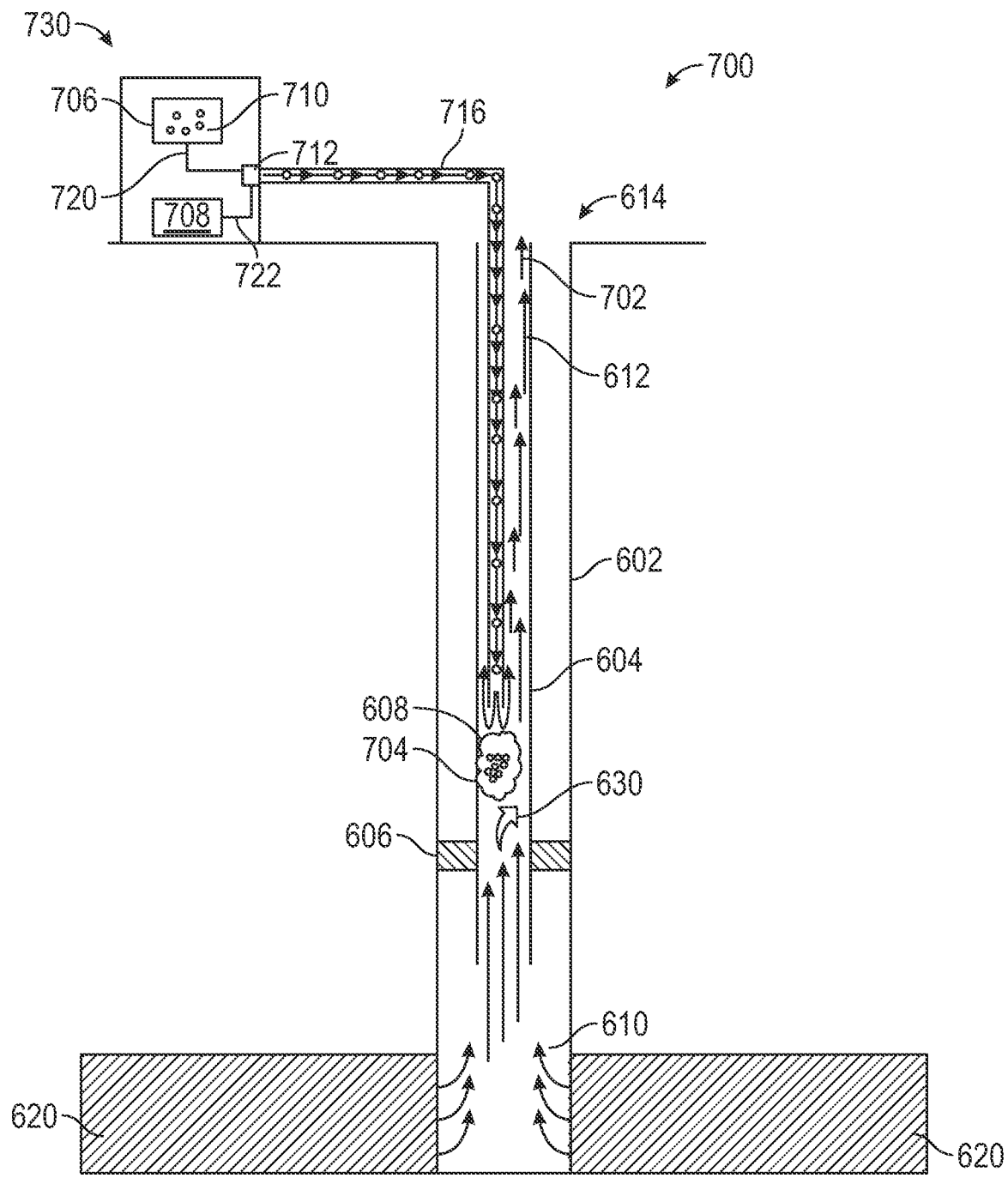
FIG. 7 is a schematic of a first step of sludge treatment for a sludge present in production tubing of a well environment in accordance with one or more embodiments.

In one or more embodiments, the wellbore may be treated, as demonstrated in FIG. 7, to clear the sludge 608 encountered in production tubing 604. Coiled tubing 716 that is connected to a treatment system 730 may be inserted in the production tubing 604. The coiled tubing 716 may be connected to treatment system 730 by means as known to one of ordinary skill in the art. Such means are represented by connector 712. A non-limiting example of connecting the production tubing 604 with the treatment system 730 includes lining the coiled tubing 716 to a lubricator and a blow-out-preventor (BOP). Then the coiled tubing 716 is nippled to the wellhead after isolating a crown valve, removing the quick-union, and removing wellhead cap. The crown valve may then be opened to run the coiled tubing in the production tubing to the sludge 608 depth.

In the first phase of the treatment method of a wellbore 700, the first treatment fluid may be introduced from a first treatment fluid compartment 710 into the coiled tubing 716 via a fluid transport line 720 from the first treatment fluid compartment 706 located in the treatment system. The fluid transport line 720 may be in fluid communication with the first treatment fluid compartment 706 and the coiled tubing 716 via connector 712. In one or more particular embodiments, the coiled tubing 716 or the production tubing may be used to circulate the first treatment fluid is through the production tubing. The first treatment fluid may be transported via coiled tubing 716 from the surface 614 downhole to the sludge 608 location. The sludge and the first treatment fluid may be determined to be in contact via knowing a targeted depth (e.g., the depth of the sludge) and the coiled tubing depth.

In one or more embodiments, the treatment agent of the first treatment fluid may adhere such that it localizes on the surface 704 of the sludge 608. In such embodiments, the treatment agent may be the surface activated carbon as described above. In one or more embodiments, the surface activated carbon that has gathered in the area of the sludge may provide a localized heating to the sludge upon reaction with the active reagents of the second treatment fluid.

Once injected, the first treatment agent in the first treatment fluid may specifically target the organic sludge. The surface activated carbon may have a selective affinity for organic materials of the sludge of a treatment area. Due to the organic matter present in sludge, it tends to have a waxy consistency, and many materials will have a propensity to stick or adhere to the sludge. In exemplary embodiments, the surface activated carbon may adhere to the organic material of the sludge in the sludge treatment area. The adhesion of the surface activated carbon may be promoted through aliphatic association, aromatic association, ionic association, and combinations thereof. In one or more embodiments, the adhesion of the surface activated carbon to organic material of the sludge may be sufficient to localize the activated carbon on the sludge for highly effective treatment.

In one or more embodiments, the organic solvent of the first treatment fluid may interact with one or more organic materials of the sludge 608 thereby dissolving that organic material such that the size of the sludge is decreased. In such embodiments, the organic solvent including solvated organic matter may be produced as indicated by solid arrows 702 from producing tubing 604 to the surface. In one or more particular embodiments, the impaction zone 630 may decrease in size such that the rate of production fluid flow 612 is increased.

In one or more embodiments, multiple pumps may be used to separately inject the first treatment fluid and the second treatment fluid. At the second stage of the treatment method 800, shown in FIG. 8, the second treatment fluid may be injected 806 from a second treatment fluid compartment 708 in the treatment system 730 via a connection line 722 through coiled tubing 716. The connection line 722 may be in fluid communication with second treatment fluid compartment 708 and connector 712. The introduction of the second treatment fluid may catalyze an exothermic reaction with the surface activated carbon adhered to the surface of the sludge. In one or more embodiments, the reaction may promote disintegration of sludge materials, dissolution of sludge materials, decreased viscosity of sludge materials due to heating, or combinations thereof. In such embodiments, the disintegrated sludge 808 and dissolved materials may be circulated 802 through the production tubing 604 to the reservoir surface 614.

The second treatment fluid may contain a second treatment agent, which may include a first reactive compound, a second reactive compound, or combinations thereof, that reacts with the surface activated carbon of the first treatment fluid. As described above, the second treatment fluid may include HCl, $NH_4Cl$, and an aqueous solvent. In one or more particular embodiments, the nitro groups of the surface activated carbon of the first injection fluid react with ammonium chloride and/or hydrochloric acid of the second treatment fluid. In such embodiments, the interaction between the surface activated carbon and at least one of the reactive agents of the second treatment fluid may result in an in-situ steam generation reaction producing heat (i.e., an exothermic reaction) and/or gas. The generated gas may be nitrogen gas, nitrogen dioxide gas, and combinations thereof.

In one or more embodiments, the localized heating may involve an in-situ steam generation from the reaction of the surface activated carbon and the active agents of the second treatment fluid. The in-situ steam generation may also include an increase in a localized pressure from the gases generated from the reaction. The in-situ steam generation and the increase in localized pressure may enhance organic compound mobility in the sludge of the treatment area. In such embodiments, the enhanced organic compound mobility may improve sludge remediation and removal from the sludge treatment area.

In one or more embodiments, a heat produced from the reaction with the active reagents of the second treatment fluid may provide localized heating to the sludge of a sludge treatment area. In such embodiments, the localized heating may be selective heating of the sludge material. The selective heating may be sufficient to melt one or more organic materials of the sludge. In one or more embodiments, the heat generated from the reaction of the surface activated carbon upon exposure to the active agents of the second treatment fluid and the gas generation are sufficient to mobilize the organic materials in the sludge. The mobilized materials may be solubilized in the carrier fluid of the first treatment fluid or other producing fluids of the reservoir.

The exothermic reaction may generate a temperature on the surface of the sludge in the range of about 30° C. to about 85° C. In one or more particular embodiments, the heat generated may be tuned to produce a target temperature on the sludge. For example, a temperature of the reaction may be tuned to produce a temperature of 65° C. for a sludge including hydrocarbons with a structural composition of approximately 35 carbon atoms.

Figure 8:
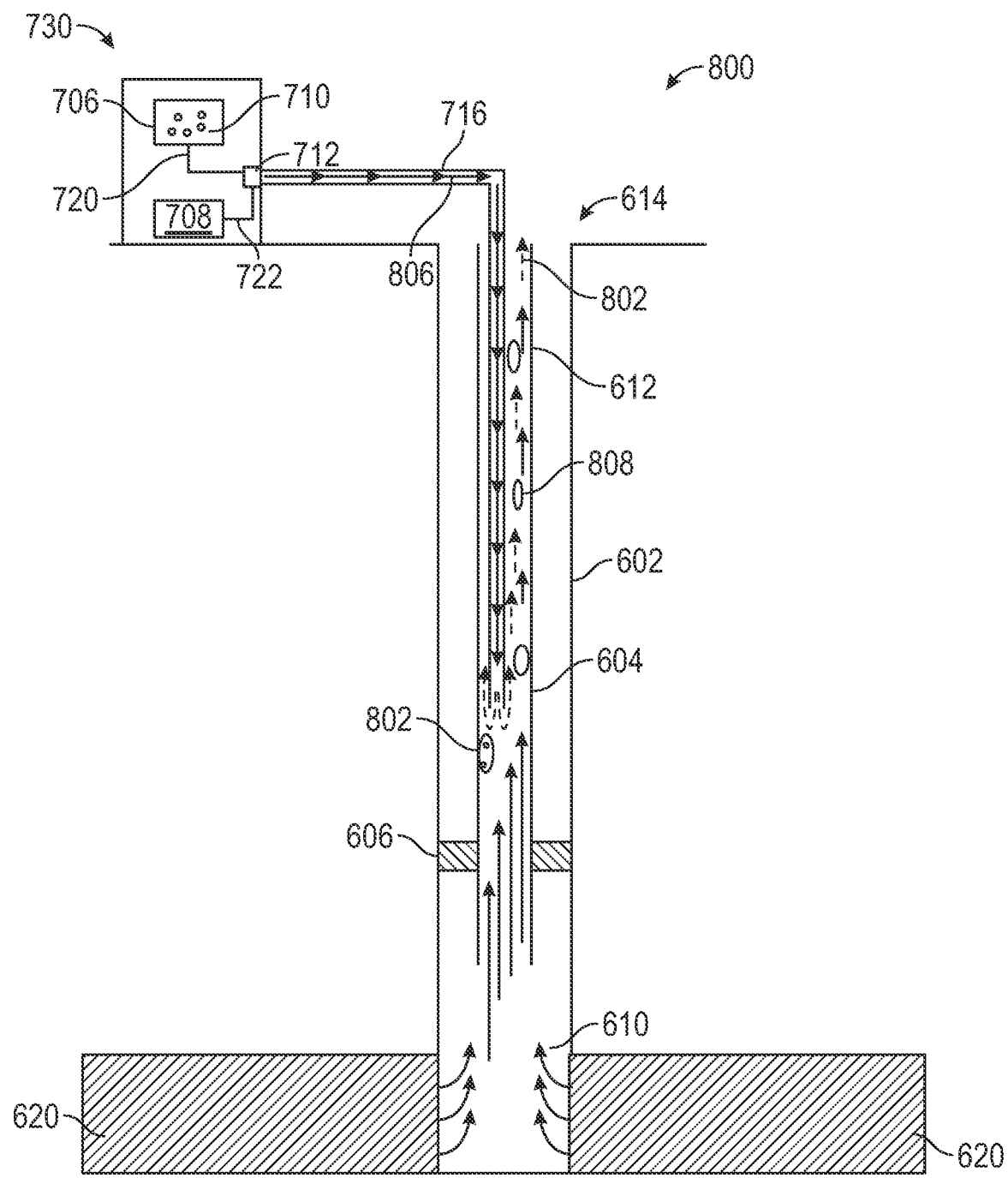
FIG. 8 is a schematic of a second step of sludge treatment for a sludge present in production tubing of a well environment in accordance with one or more embodiments.

In one or more particular embodiments, the impaction zone may be partially or completely removed such that the production fluid flow rate from the oil zone 620 through the production tubing 604 is restored, as shown in FIG. 8. The removal percentage of sludge from reservoir operations of one or more embodiments may be determined via produced fluid flow rate before and after treatment. In such embodiments, the amount of sludge removed may be at least 60% removed, at least 65% removed, or at least 70% removed. Sludge removal percentages of one or more embodiments may be determined via determination of restored production fluid flow rates. For example, a restored production fluid flow rate may be defined as the recovery of a production fluid flow rate after treatment according to one or more embodiments of the present disclosure. The produced fluid flow rate after treatment may be recovered such that the production fluid flow rate is restored to a production fluid flow rate prior to sludge impaction of the production tubing. Once the sludge has been successfully treated, the coiled tubing may be removed and the production fluid flow rate is tested to determine restoration of production fluid flow. Production fluid flow may be considered "restored" by comparing the fluid flow prior to treatment when sludge is present versus after applying the treatment. If the production fluid flow rate is restored, the treatment operations are concluded.

The efficacy of various treatment fluids described herein may also be tested in a laboratory setting. A non-limiting example includes the collection of a bulk sample of sludge from a wellbore. The sludge may be transferred to a treatment setting, such as a laboratory. The removal percentage of the sludge may be determined via studies of the weight difference of the sludge before and after treatment.

Fluid injection rates of treatment fluids of one or more embodiments may be in a range from 1 bbl/min (barrels of oil per minute) to 2 bbl/min. In one or more particular embodiments, reservoir operations may continue during the sludge treatment process. In one or more optional embodiments, reservoir operations may be slowed and/or halted for the treatment process to proceed.

In one or more embodiments, the method described herein may also be used as a method to remove an inorganic scale. The organic scale may be removed by at least two active ingredients of the second treatment fluid, which include an ammonium compound and an acid, such as hydrochloric acid, sulfuric acid, or an organic acid. In such embodiments, the acid may promote dissolution of inorganic scale. In such embodiments, the acid may be included in an amount ranging from about 10 to 20 vol % acid of the total volume of the second treatment fluid. In one or more particular embodiments, the acid may be hydrochloric acid. In some embodiments, the inorganic scale may include at least one compound selected from the group consisting of a calcium carbonate scale, an iron carbonate scale, a magnesium carbonate scale, an iron oxide, sulfide scales, and combinations thereof.

In one or more embodiments, reduced volumes of treatment fluid may be pumped in the well during the removal of the organic sludge compared to traditional treatment strategies. This may be due to the activated carbon adhering to the sludge for localized, concentrated treatment. In such embodiments, the present disclosure provides an effective and resource efficient sludge treatment method.

EXAMPLES

Example 1: Surface Activated Carbon Synthesis

Activated carbon used in this reaction was purchased from Sigma Aldrich (20-40 microns). Sulfuric acid (98%), nitric acid (63%), glacial acetic acid, and hydrochloric acid were purchased from Spectrum Chemical.

Figure 9:
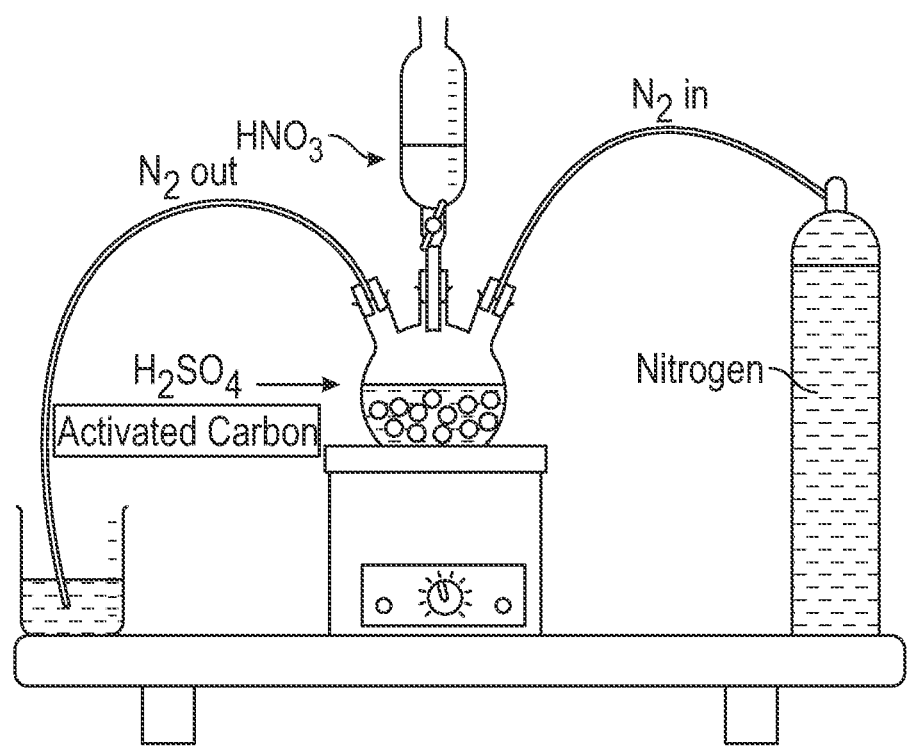
FIG. 9 is a schematic of a reaction setup to produce a treatment agent in accordance with one or more embodiments.

The surface activated carbon (or Carbite®) was synthesized using porous activated carbon, sulfuric acid, and nitric acid in an inert environment. The reaction setup is shown in FIG. 9. Activated carbon (15 grams, g) and sulfuric acid (100 milliliters, mL) were added together in a 3-neck round bottom flask. The flask was stirred and heated to 80° C. using a heating mantle. Nitrogen was flowed continuously through the system to maintain an inert atmosphere. Nitric acid (42 mL) was then added dropwise over 3 hours. Then, the reaction was left to stir for another 3 hours at the elevated temperature. After a total of 6 hours, the Carbite® was isolated from the solution via filtration. The Carbite® was then purified from excess acids by washing with 30 mL water, and then re-filtering. The washing and filtration process was repeated five times.

Figure 10:
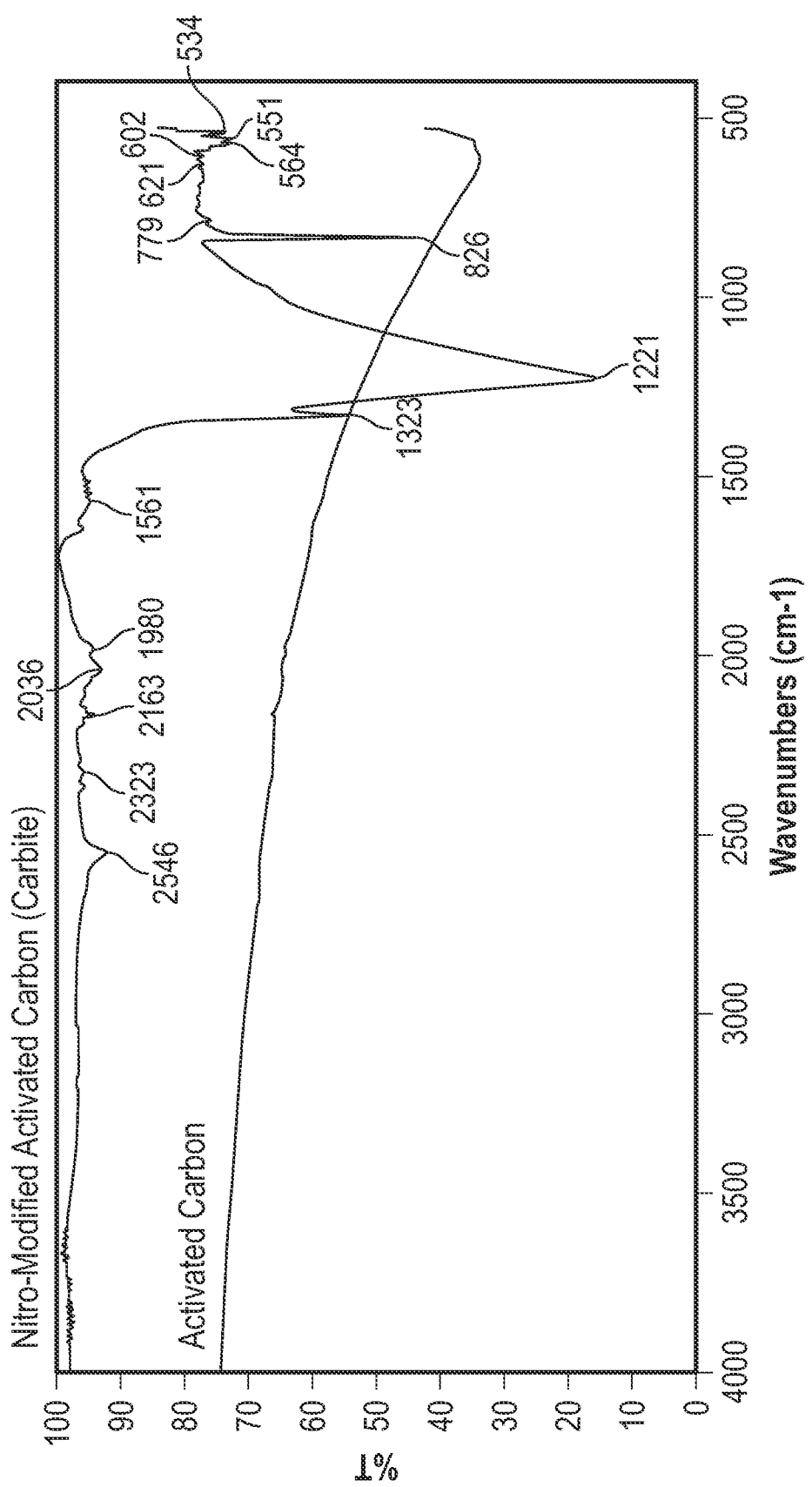
FIG. 10 is a comparison of FTIR results of an untreated activated carbon and a surface activated carbon in accordance with one or more embodiments.

The Carbite® product was characterized using Fourier Transform Infrared Spectroscopy (FTIR) as shown in FIG. 10. Carbite® and a sample of the porous activated carbon starting material were analyzed via FTIR. As shown in the Carbite® trace in FIG. 10, prominent bands, such as at 1221 cm' and 1323 cm', indicate the surface activated carbon was formed.

Example 2: Sludge Compositional Analysis

Figure 11:
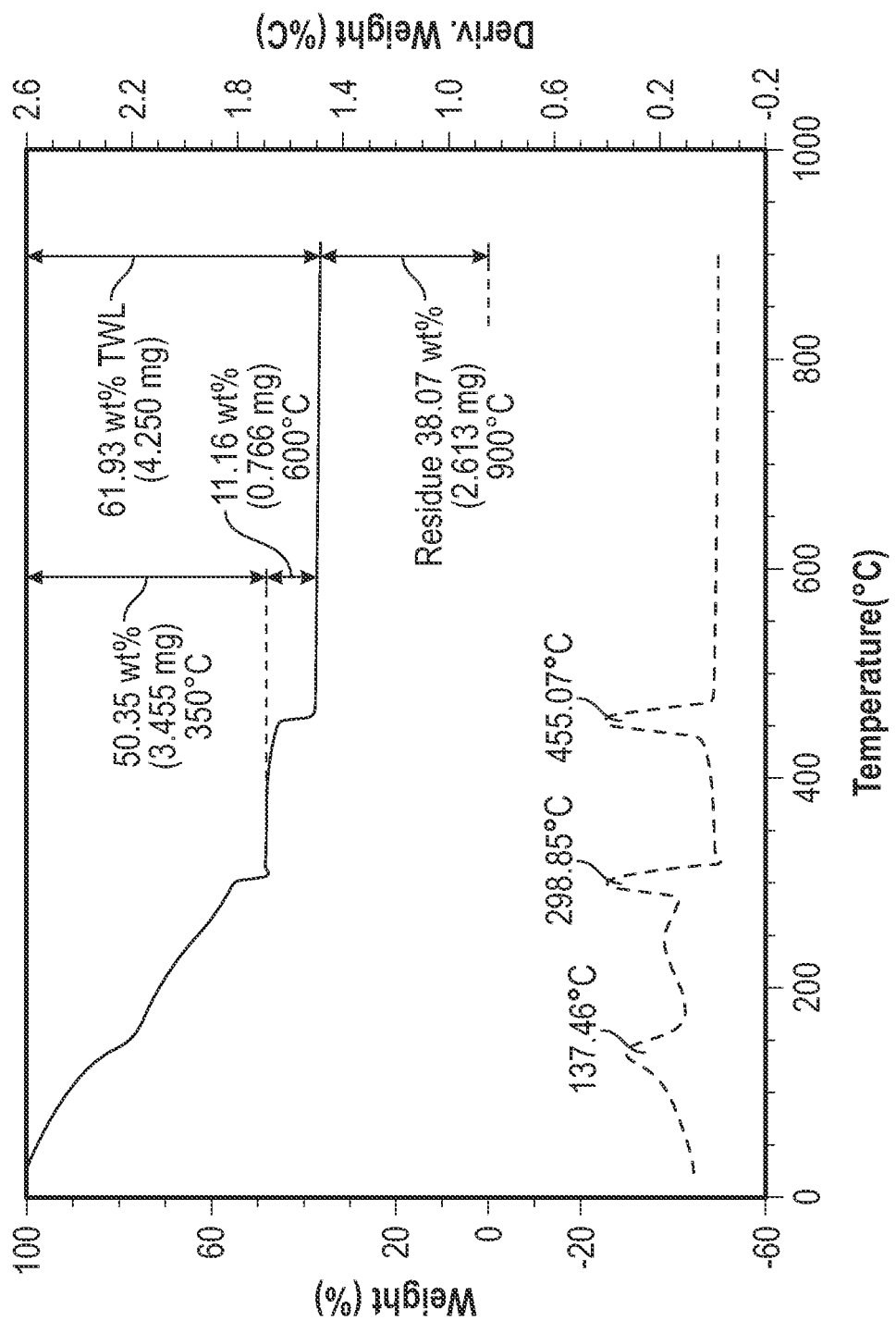
FIG. 11 is an example of results obtained from thermogravimetric analysis of a sludge sample in accordance with one or more embodiments.

Compositional analyses as described above in FIG. 5 were performed on a sludge sample that was collected from an active hydrocarbon bearing formation Thermogravimetric analyses (TGA) were performed to determine weight percentages of inorganic materials and organic materials. The organic material weight percent of the sludge samples was measured as a percent of weight loss between 20° C. and 900° C., a total content of 61.9 wt % of sludge sample 1 (FIG. 11). The inorganic material content was determined by the remaining mass percent after a TGA temperature ramp to 900° C. was determined to be 38.1 wt % (FIG. 11). The components of the sludge sample are shown in Table 1 as weight percentages determined by TGA.

TABLE 1

Compositional Analysis of Sludge

| Sample | Inorganic Material | Organic Material |
|---|---|---|
| 1 | 38.1 wt % | 61.9 wt % |

Figure 12:
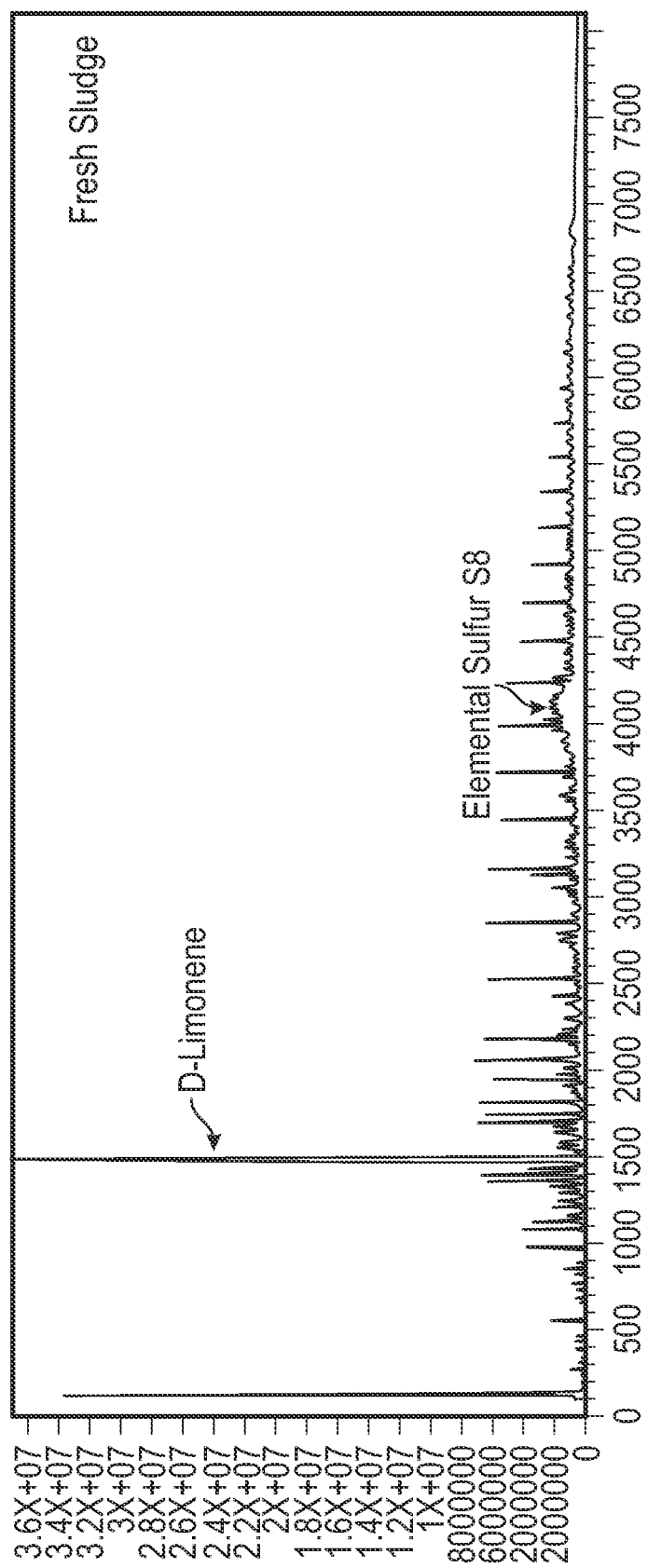
FIG. 12 is a gas chromatographic spectrum of organic materials from a sludge sample in accordance with one or more embodiments.
Figure 13:
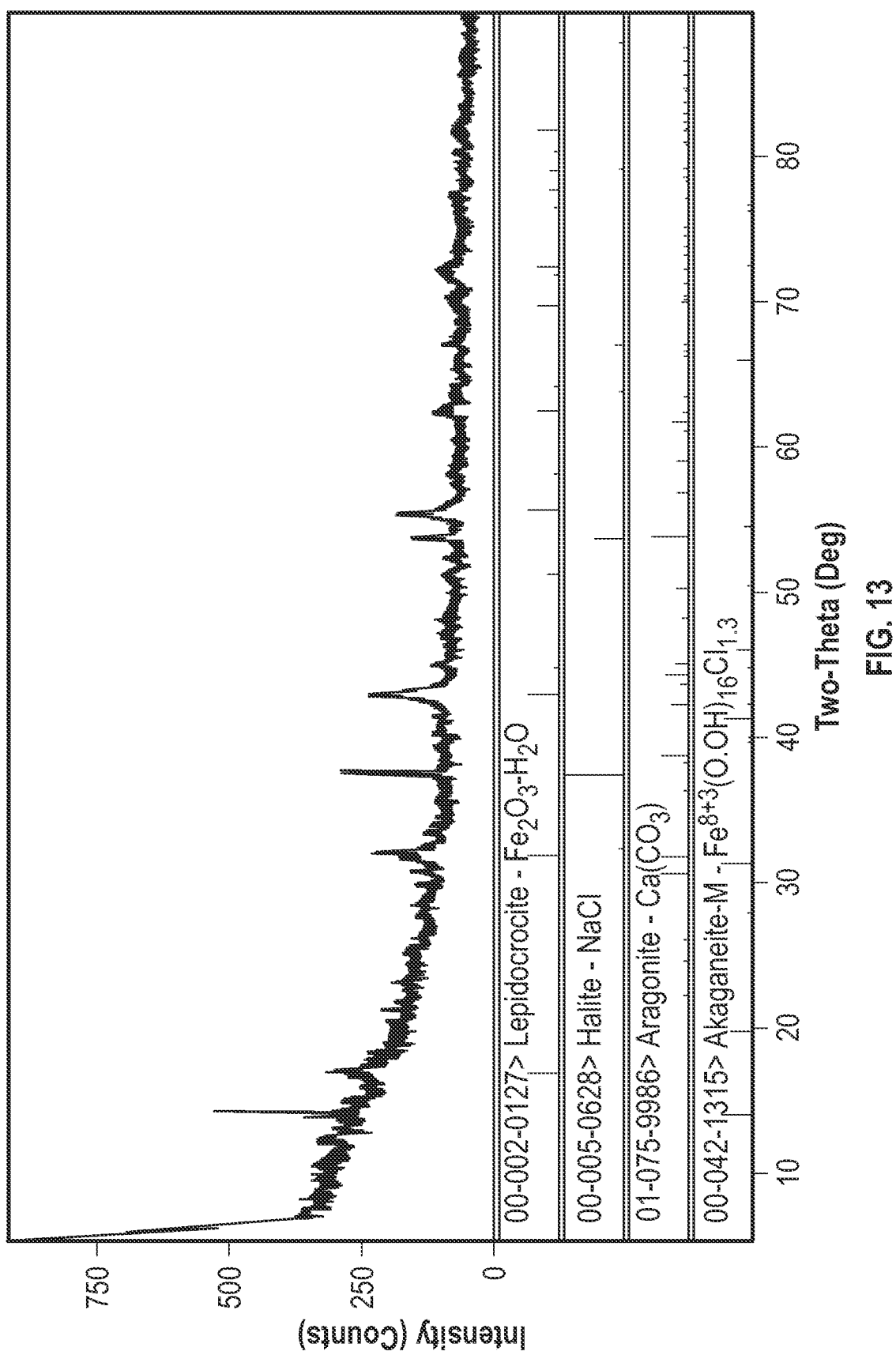
FIG. 13 is an X-ray diffraction spectrum of inorganic materials from a sludge sample in accordance with one or more embodiments.

Gas chromatography (GC) was performed to determine the composition of organic matter. Powder X-ray diffraction (XRD) was performed to analyze the composition of inorganic matter. Prior to PXRD analysis, the sludge sample was washed with organic solvents toluene and dichloromethane to enhance the signal and reduce the noise of XRD results. Gas chromatographic (GC) results of organic matter are shown in FIG. 12, which indicate that the sludge sample has a significant concentration of D-limonene and elemental sulfur (S8) along with organic material of varying chain length and relatively low molecular weights along with organic material consisting of a larger molecular weight and high melting points. In addition, XRD results of the sludge sample shown in FIG. 13 indicate the presence of iron oxide (Lepidocrocite), sodium chloride (Halite), calcium carbonate (Aragonite), and iron oxide chloride (Akaganeite).

Example 3: Sludge Remediation Studies

Exothermic capabilities of the Carbite® provided from Example 1 were explored with various means of stimulation in the presence the sludge sample characterized in Example 2.

To a beaker containing 1.05 g of sludge was added, and 0.48 g of Carbite® that was dispersed in 5 mL of toluene was introduced. Then, aqueous solutions containing 5 mL of 15 wt % acid was added. In trials including ammonium chloride ($NH_4Cl$) as a co-reactant, $NH_4Cl$ (0.49 g) was also included in the aqueous solution along with the acid.

Table 2 below, shows resultant temperature increases from a room temperature value of 25° C. after four minutes of Carbite® exposure to aqueous solutions.

TABLE 2

Treatment conditions for organic sludge

| | Temperature Change, ° C. | | Observations |
|---|---|---|---|
| Acid | without $NH_4Cl$ | with $NH_4Cl$ | with $NH_4Cl$ |
| Acetic Acid | 24 | 30 | Colorless gas |
| Sulfuric Acid | 84 | 86 | Brown gas |
| Hydrochloric Acid | 58 | 69 | Brown gas |

Sludge removal efficiency was calculated based on weights of the sludge and Carbite® before treatment. After the tests were concluded, the contents of the beaker were filtered, and the mass of the solids was measured. The amount of dissolved sludge was determined by subtracting the mass of the filtered solids from the mass of total solids (sludge and Carbite®) prior to treatment. Dividing the amount of dissolved sludge by the initial sludge weight was used to determine the efficiency. In the study involving hydrochloric acid, it was determined that the sludge treatment achieved about 70% sludge removal efficiency.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. An injection fluid composition comprising:
   a treatment agent comprising a material having a reactive surface functionality,
      wherein the material is selected from the group consisting of graphite, graphene, activated carbon, and combinations thereof,
      wherein the reactive surface functionality is a nitro group directly bonded to a carbon atom of a surface of the material, and
      wherein the treatment agent comprises an amount ranging from 1 to 15 wt % of the reactive surface functionality; and
   a carrier fluid.

2. The composition of claim 1, wherein the carrier fluid is an organic solvent.

3. The composition of claim 2, wherein the organic solvent is selected from the group consisting of diesel, toluene, xylene, ethylbenzene, and combinations thereof.

4. The composition of claim 1, wherein the material has a surface area ranging from 500 to 3000 $m^2/g$.

5. The composition of claim 1, wherein the material has a density in a range of 0.20 to 0.55 g/mL.

6. The composition of claim 1, wherein the reactive surface functionality is configured to undergo a reaction upon an introduction of a stimulus so as to produce an exothermic process and a gas, wherein the stimulus comprises an ammonium containing compound, an acid, or combinations thereof, and wherein the gas is nitrogen gas, nitrogen dioxide gas, or combinations thereof.

7. The composition of claim 1, comprising from about 0.05 to about 1.00 wt % of the treatment agent based on the total weight of the injection fluid.

8. A method of treating a sludge in production tubing, the method comprising:
   injecting a first fluid comprising a treatment agent in a carrier fluid into the production tubing, wherein the treatment agent comprises a material having a reactive surface functionality,
      wherein the material is selected from the group consisting of graphite, graphene, activated carbon, and combinations thereof,
      wherein the reactive surface functionality is a nitro group directly bonded to a carbon atom of a surface of the material, and
      wherein the treatment agent comprises an amount ranging from 1 to 15 wt % of the reactive surface functionality;
   contacting the sludge with the treatment agent;
   maintaining the first fluid downhole such that the treatment agent adheres to a surface of the sludge;
   injecting a second fluid comprising a stimulating agent to stimulate the treatment agent; and
   extracting compounds of the sludge from the production tubing.

9. The method of claim 8, wherein the first fluid is an organic fluid.

10. The method of claim 8, wherein the second fluid is an aqueous fluid.

11. The method of claim 8, wherein the stimulating agent comprises at least one of a first reactive compound and a second reactive compound.

12. The method of claim 11, wherein the first reactive compound is selected from the group consisting of ammonium chloride, ammonium bromide, ammonium nitrate, ammonium sulfate, ammonium carbonate, ammonium hydroxide, and combinations thereof.

13. The method of claim 11, wherein the second reactive compound is an acid.

14. The method of claim 8, wherein the material having the reactive surface functionality comprises a reaction product of a nitro group and a carbon of an activated carbon.

15. The method of claim 8, wherein the stimulation of the treatment agent produces an exothermic process, a gas, or combinations thereof.

16. The method of claim 15, wherein the gas comprises a nitrogen gas.

* * * * *